United States Patent [19]
Matsumoto et al.

[11] Patent Number: 6,064,481
[45] Date of Patent: May 16, 2000

[54] METHOD AND APPARATUS FOR POSITIONING OBJECT IN SPACE USING A LOW-COHERENCE LASER BEAM WHICH IS REFLECTED BY TWO REFERENCES TO SHARPEN THE INTERFERENCE FRINGE LINES

[75] Inventors: Hirokazu Matsumoto; Kaoru Minoshima, both of Tsukuba, Japan

[73] Assignees: Agency of Industrial Science & Technology; Ministry of International Trade & Industry, both of Tokyo, Japan

[21] Appl. No.: 08/917,804

[22] Filed: Aug. 27, 1997

[30] Foreign Application Priority Data

Aug. 27, 1996 [JP] Japan ..................................... 8-225153

[51] Int. Cl.[7] ...................................................... G01B 9/02
[52] U.S. Cl. ............................ 356/357; 356/360; 356/363
[58] Field of Search ..................................... 356/345, 358, 356/360, 363, 349, 351, 357

[56] References Cited

U.S. PATENT DOCUMENTS

| | | | |
|---|---|---|---|
| 4,355,900 | 10/1982 | Nussmeier | 356/358 |
| 5,301,010 | 4/1994 | Jones et al. | 356/358 |
| 5,394,240 | 2/1995 | Mastaumoto . | |

*Primary Examiner*—Samuel A. Turner
*Attorney, Agent, or Firm*—Oblon, Spivak, McClelland, Maier & Neustadt, P.C.

[57] ABSTRACT

An object is positioned in space by using a beam splitter to split a low-coherence laser light beam into a probe beam and a reference beam. The probe beam is projected at the target object, while the reference beam is reflected by a pair of mirrors synchronized along light paths and scanned at different amplitudes, to form two beams of equal intensity, and light reflected by the object and the interference fringes are detected together to obtain fringe signals with sharpened profile lines.

6 Claims, 2 Drawing Sheets

SCANNING

METHOD AND APPARATUS FOR POSITIONING OBJECT IN SPACE USING A LOW-COHERENCE LASER BEAM WHICH IS REFLECTED BY TWO REFERENCES TO SHARPEN THE INTERFERENCE FRINGE LINES

BACKGROUND OF THE INVENTION

1. Field of the Invention

The present invention relates to a method of using light waves for precisely positioning an object in space for use in precision manufacturing fields such as the electronics industry and the precision machinery industry, and to an apparatus for implementing the method.

2. Description of the Prior Art

Methods are recently being developed that utilize quasi white light interferometry for positioning control and dimensional metrology applications in industries such as the electronics, precision machinery and biotechnology industries, using low coherent light semiconductor lasers or solid state lasers as light sources. Methods are also being developed that use a plurality of lasers, each with a different wavelength, to improve the precision with which an object can be positioned in space.

However, with respect to the former methods, low coherent light semiconductor lasers or solid state lasers are not capable of delivering the type of spectral band width required of a light source used for quasi white light interferometry, while in the latter methods in which a plurality of light sources are employed, synchronizing two or more laser light sources necessitates stabilizing the light sources and using the light sources in a stable environment, which limits the applicability of the methods.

Moreover, in both types of methods the light sources have a relatively narrow spectral band width in the order of 10 nm, so coherence is relatively good, resulting in a large number of interference fringes, in addition to which the interference fringes have flat profile lines, making it difficult to identify the zero order white light interference fringe. Hence, spatial positioning precision is poor.

An object of the present invention is to provide a method and apparatus that readily enables an object to be positioned in space with high precision, using quasi white light interferometry that employs a single low-coherence laser as the light source.

SUMMARY OF THE INVENTION

For achieving the aforesaid object, the present invention provides a method for positioning an object in space, comprising using a beam splitter to split a low-coherence laser light beam into a probe beam and a reference beam, projecting the probe beam at an object of interest, dividing the reference beam into two beams of equal intensity, forming a plurality of interference fringes by reflecting the two beams by two mirrors synchronized along light paths of the two beams while scanned at different amplitudes, and simultaneously photoelectrically detecting light reflected by the object and the interference fringes to sharpen profile lines of signals of the interference fringes.

The aforesaid object is also attained by an apparatus for positioning an object in space comprising a laser light source that emits a low-coherence laser beam, a beam splitter for dividing the laser beam into a probe beam for irradiating a target object, and a reference beam, two mirrors that reflect the reference beam as two beams of equal intensity and form a plurality of interference fringes by being synchronized along light paths of the two beams while being scanned at different amplitudes, and photoelectric elements that simultaneously detect light reflected by the object and the interference fringes to sharpen profile lines of signals of the interference fringes.

As described above, in accordance with this invention a low-coherence laser beam from a single light source is reflected by two mirrors synchronized while scanned at different amplitudes, to form two beams of apparently different wavelengths. Interference between these two beams is used to form a plurality of interference fringes. By simultaneously photoelectrically detecting the reflected light from the object together with the interference fringes, an interference fringe signal is obtained having a sharpened profile line close to that produced by white light having a wide spectral band width. Using this interference fringe signal for positioning enables an object to be positioned with ease and accuracy. Moreover, since just one laser is used as the light source, light source stabilization becomes unnecessary and the structure is simplified.

Further features of the invention, its nature and various advantages will be more apparent from the accompanying drawings and following detailed description of the invention.

BRIEF DESCRIPTION OF THE DRAWINGS

FIG. 4 (*b*) is an interference fringe signal obtained by the method of this invention.

DESCRIPTION OF THE PREFERRED EMBODIMENT

Figure 1:
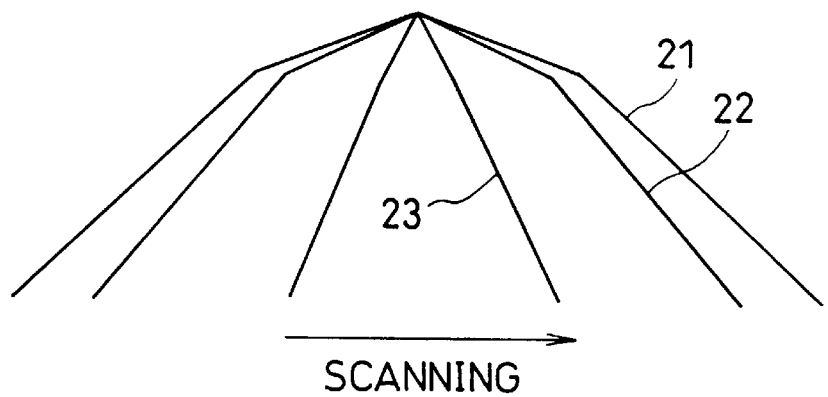
FIG. 1 is a diagram illustrating the principle used for positioning an object in space according to the present invention.

FIG. 1 is a diagram illustrating the principle used to sharpen profile lines of fringes obtained with quasi white light interferometry in accordance with the method of the present invention. Superposing quasi white light interference fringes 21 and 22, neither of which has a very large spectral band width, produces an intensification of the fringes when the fringes are in phase, and a mutual cancellation when the fringes are in opposite phase. That is, an interference fringe signal 23 is obtained having sharper profile line that is close to an interference fringe produced by white light having a large band width in which amplitude is high in the center and rapidly falls off to each side.

Figure 2:
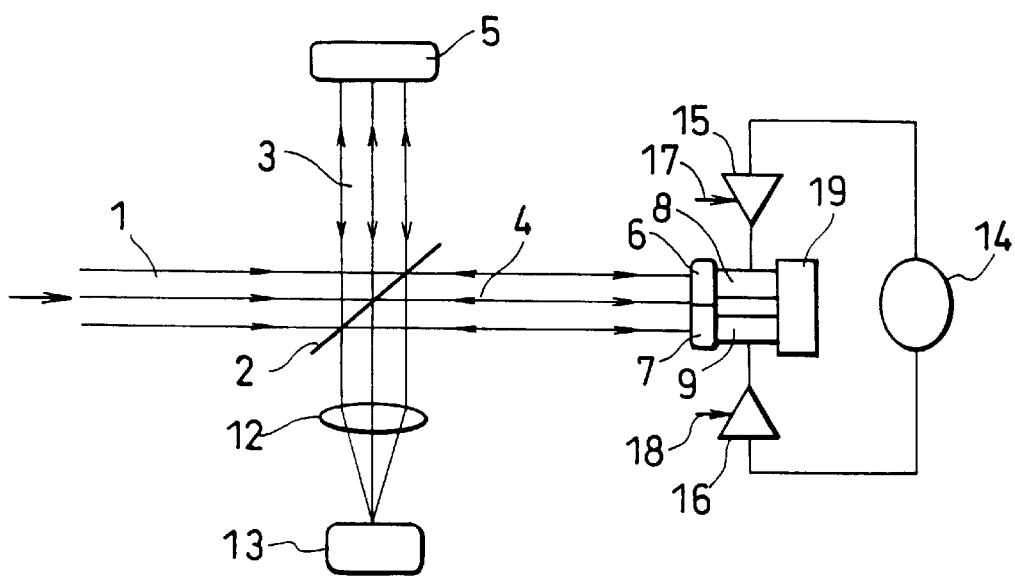
FIG. 2 is a block diagram showing the optical configuration of an embodiment of a positioning apparatus according to the invention.

FIG. 2 shows an example of a quasi white light interferometry optical system for implementing the spatial positioning method of the present invention. A low-coherence laser light beam 1 produced by a semiconductor laser and optical collimation system, not shown, is split into a probe beam 3 and a reference beam 4. The probe beam 3 is reflected by a target object 5 and passes through the beam splitter 2 and is focused by a lens 12 onto a photoelectric element 13.

The reference beam 4 is guided to scanning mirrors, in this embodiment, mirrors 6 and 7. These mirrors 6 and 7 reflect the reference beam 4 as two beams of equal intensity.

Figure 3:
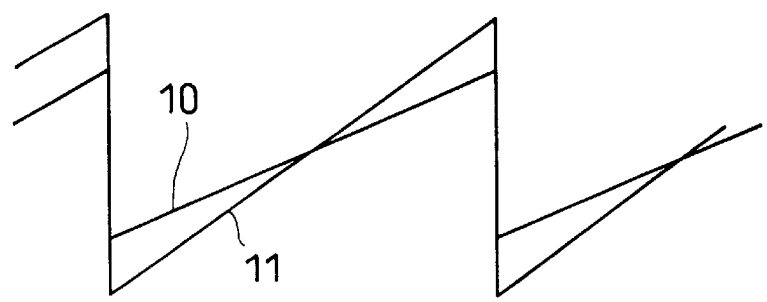
FIG. 3 is an example of a scanning pattern produced by the mirror arrangement of the invention.

The mirrors 6 and 7 are independently supported by respective electrostrictive elements 8 and 9 provided on a stage 19. The electrostrictive elements 8 and 9 are supplied with signals for scanning the mirrors 6 and 7 in phase at different amplitudes 10 and 11, as shown in FIG. 3. The result is that an interference fringe is formed that is equivalent to the interference between the beams from the reference path and the light reflected by the object.

After the two beams of reflected light are reflected by the beam splitter 2, they are concentrated, together with the light reflected by the object 5, by the lens 12, and the interference fringes thus produced are detected by the photoelectric element 13, thereby obtaining a signal that is equivalent to a signal resulting from a large band width, low-coherence light source, enabling the spatial position of the surface of the object 5 to be determined with high precision. By supplying the electrostrictive elements 8 and 9 with signals from the same oscillator 14 that are amplified by amplifiers 15 and 16 and adjusted by offset voltages 17 and 18, the profile lines of the interference fringes are sharpened, making it possible to correctly identify the zero order white light interference fringe and thereby readily obtain improved spatial positioning precision.

Figure 4A:
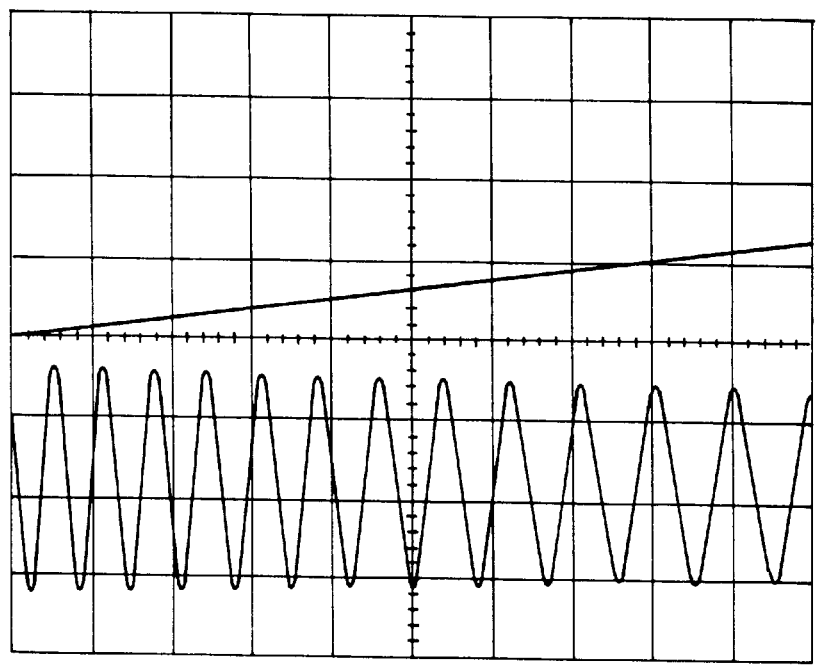
FIG. 4 (*a*) is an interference fringe signal obtained by a conventional method.
Figure 4B:
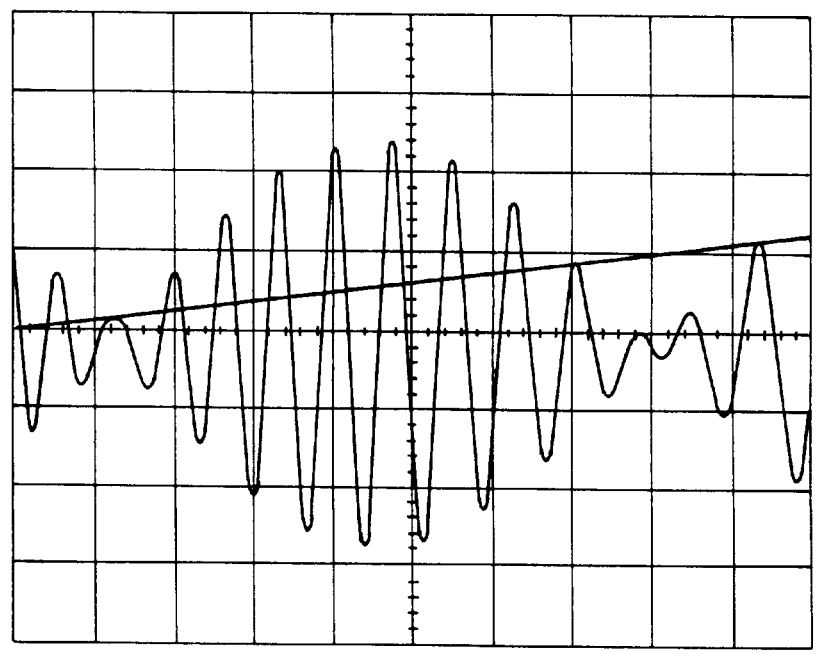

To confirm the effect of the invention, the optical system shown in FIG. 2 was used to produce interference between a 632.9 nm beam from a He-Ne laser and a 637.1 nm beam from an LD laser. FIG. 4 (*a*) shows the interference fringe signal obtained when the two mirrors were fixed, resulting an interference fringe signal with a substantially flat profile line. When one of the mirrors was supported by a 1 $\mu$m/V electrostrictive element and the other mirror was supported by 0.1 $\mu$m/V electrostrictive element and each electrostrictive element supplied with its respective voltage signal to cause the two mirrors to scan along the same path at different amplitudes, as shown in FIG. 4 (*b*) the result was that the interference pattern obtained was similar to that produced by white light and a fringe signal was obtained having a sharpened profile line, verifying the effectiveness of the invention.

As described in the foregoing, the method for positioning an object in space according to the present invention relates to a new positioning technology that has high value as a control technology for controlling devices and dimensional metrology relating to samples, parts and products in the precision machinery industry, in production of semiconductor devices and other electronic devices as well as in biotechnology and medicine.

Moreover, a single light source is used and the light paths used to form multiple interference fringes are virtually the same, so the environmental characteristics are also good, and the fact that the apparatus has a simple structure is another of the advantageous effects provided by the invention.

Obviously, numerous modifications and variations of the present invention are possible in light of the above teachings. It is therefore to be understood that within the scope of the appended claims, the invention may be practiced otherwise than as specifically described herein.

What is claimed is:

1. A method for positioning an object in space, comprising:

using a beam splitter to split a low-coherence laser light beam into a probe beam and a reference beam;

projecting the probe beam at an object of interest to produce a first reflected beam;

dividing the reference beam into two beams of equal intensity;

protecting the two divided beams respectively at two mirrors synchronized along light paths of the two divided beams while scanned at different amplitudes to produce a second reflected beam and a third reflected beam;

forming a plurality of interference fringes from the first, second and third reflected beams; and photoelectrically detecting the plurality of interference fringes to sharpen profile lines of the plurality of interference fringes.

2. A method according to claim 1, wherein the plurality of interference fringes having the sharpened profile lines correspond to zero order white light interference fringes.

3. An apparatus for positioning an object in space, comprising:

a laser light source that emits a low-coherence laser beam;

a beam splitter configured to divide the laser beam into a probe beam and a reference beam, the probe beam irradiating a target object to produce a first reflected beam;

two mirrors that reflect the reference beam as a second reflected beam and a third reflected beam of equal intensity and are synchronized along light paths of the second and third reflected beams while scanned at different amplitudes; and photoelectric elements that photoelectrically detect a plurality of interference fringes formed from the first, second and third reflected beams to sharpen profile lines of the plurality of interference fringes.

4. An apparatus according to claim 3, wherein the two mirrors are attached to two electrostrictive elements that are in phase but have different amplitudes.

5. A system for positioning an object in space, comprising:

means for splitting a low-coherence laser light beam into a probe beam and a reference beam;

means for projecting the probe beam at an object of interest to produce a first reflected beam;

means for dividing the reference beam into two beams of equal intensity;

means for projecting the two divided beams respectively at two mirrors synchronized along light paths of the two divided beams while scanned at different amplitudes to produce a second reflected beam and a third reflected beam;

means for forming a plurality of interference fringes from the first, second and third reflected beams; and means for photoelectrically detecting the plurality of interference fringes to sharpen profile lines of the plurality of interference fringes.

6. A system according to claim 5, wherein the plurality of interference fringes having the sharpened profile lines correspond to zero order white light interference fringes.

\* \* \* \* \*